United States Patent Office 2,953,543
Patented Sept. 20, 1960

2,953,543

STABILIZED SILICONE ELASTOMERS AND PROCESS FOR THEIR PRODUCTION

Roscoe A. Pike, Grand Island, N.Y., assignor to Union Carbide Corporation, a corporation of New York No Drawing. Filed June 19, 1958, Ser. No. 742,977

18 Claims. (Cl. 260—45.95)

This invention relates to organosilicon compositions. More particularly, this invention relates to silicone elastomers that are protected against oxidation at elevated temperatures (i.e. stabilized) and to a process for the production of such elastomers.

Silicone elastomers are useful in many applications because of their desirable physical properties, such as their dielectric properties and thermal stability at moderate temperatures. However, silicone elastomers have been found to decompose when heated in air at elevated temperatures for prolonged periods of time, apparently due to an oxidation reaction. The temperature at which a silicone elastomer decomposes is dependent upon the organic substituents present in the gum from which it is produced. By way of illustration, a silicone elastomer produced from a gum composed of diethylsiloxy groups was found to decompose when heated at 150° C. for 6 hours, whereas a silicone elastomer produced from a gum composed of predominately dimethylsiloxy groups and small amounts of ethylvinylsiloxy groups was found to decompose when heated at 250° C. for 24 hours. The decomposition of silicone elastomers at elevated temperatures was found to result in the loss of desirable properties, such as a decrease in tensile strength.

Silicone elastomers are produced by curing organopolysiloxane gums, usually employing organic peroxides (most often benzoyl peroxide) as curing agents and carbonaceous or inorganic fillers. It has been proposed that the decomposition of silicone elastomers at elevated temperatures might be avoided by incorporating an organic antioxidant in an organopolysiloxane gum and then curing the gum using benzoyl peroxide as a curing agent. This proposal was not found satisfactory since organic antioxidants were found to react with the benzoyl peroxide used to cure the organopolysiloxane gum. Neither the antioxidant nor the benzoyl peroxide was then able to perform its intended function.

Another process that has been suggested to stabilize silicone elastomers involves applying a solution of an organic antioxidant dissolved in an organic solvent to an elastomer, allowing the solution to penetrate into the elastomer and then removing the solvent to produce an elastomer containing the antioxidant. This process was not found to be particularly useful since such solutions do not readily penetrate into the interior of silicone elastomers and so antioxidant is not uniformly dispersed throughout the elastomer. Such solutions cause swelling of the silicone elastomers. In addition, it is difficult to precisely control the amount of the antioxidant incorporated in the elastomer by this process and it is difficult to entirely remove the solvent from the elastomer.

It has been recently found that stabilized silicone elastomers can be produced by a process that involves mixing an organopolysiloxane gum, an organic peroxide curing agent and an organic antioxidant that is retained by a zeolitic molecular sieve to form a curable gum compound and heating the gum compound so formed to a temperature sufficiently elevated to cure the gum compound to produce an elastomer. The zeolitic molecular sieves used in this process are crystalline metal-aluminosilicates and have been found to possess strong sorbtion properties by virtue of which they retain (i.e. absorb and/or adsorb) the organic antioxidant. The organic antioxidant so retained is prevented from reacting with the peroxide during curing. However, after curing, that is after the peroxide has effected curing and decomposed, the antioxidant can be released by heating the elastomer to a temperature above that normally used for curing and sufficiently elevated to release the antioxidant from the zeolitic molecular sieve. Although this process has proven useful in stabilizing silicone elastomers against decomposition at elevated temperatures and is most suitable for many applications, there are some instances in which the additional process step required (i.e. causing the organic antioxidant to be retained by the zeolitic molecular sieve) and an additional component (i.e. the zeolitic molecular sieve) are not commercially feasible.

This invention is based, in part, on the discovery that certain combinations of organic antioxidants and organic peroxide curing agents, specifically hydroxyl-substituted aromatic compounds as antioxidants and diacyl peroxide curing agents, when employed in certain relative amounts may be used in the production of stabilized silicone elastomers. It was found that when these combinations are used the antioxidant does not react with the curing agent.

This invention provides for the production of stabilized silicone elastomers by a process which involves mixing an organopolysiloxane gum, a hydroxyl-substituted aromatic compound as an antioxidant and a diacyl peroxide curing agent in an amount larger than the amount of the antioxidant to form a curable gum compound and heating the curable gum compound to a temperature sufficiently elevated to cure the gum compound to produce an elastomer.

The starting organopolysiloxane gums used in this invention include both homopolymeric and copolymeric siloxanes. These siloxanes contain siloxane groups represented by the formula:

$$\left[ \begin{array}{c} R \\ | \\ -SiO- \\ | \\ R' \end{array} \right] \quad (1)$$

wherein R is a monovalent hydrocarbon group that is free of olefinic unsaturation and R' is a monovalent olefinically unsaturated hydrocarbon group or a monovalent hydrocarbon group that is free of olefinic unsaturation. The ratio of the organic groups (i.e. monovalent hydrocarbon groups that are free of olefinic unsaturation and monovalent olefinically unsaturated hydrocarbon groups) to silicon atoms in the starting organopolysiloxane gum is from 1.95 to 2.05.

Illustrative of the monovalent olefinically unsaturated hydrocarbon groups that are represented by R' in Formula 1 are the alkenyl groups (for example the vinyl and the allyl group) and the cycloalkenyl groups (for example the cyclohexenyl group). The preferred monovalent olefinically unsaturated hydrocarbon group is the vinyl group.

Illustrative of the monovalent hydrocarbon groups that are free of olefinic unsaturation and that are represented by R and R' in Formula 1 are the alkyl groups (for example the methyl, ethyl and propyl groups); the aryl groups (for example the phenyl group); the aralkyl groups (for example the benzyl and the phenylethyl group); and the cycloalkyl groups (for example the cyclohexyl group).

Useful organopolysiloxane gums may contain siloxane groups that are represented by Formula 1 wherein either the same hydrocarbon groups are attached to the silicon atoms (e.g. the dimethylsiloxy, diphenylsiloxy and diethylsiloxy groups) or different hydrocarbon groups are attached to the silicon atoms (e.g. the methylphenylsiloxy, phenylethylmethylsiloxy, ethylphenylsiloxy, methylvinylsiloxy and phenylvinylsiloxy groups).

Useful starting organopolysiloxane gums contain one or more types of siloxane groups represented by Formula 1. By way of illustration, one useful gum is composed of only dimethylsiloxy groups; a second useful gum is composed of methylvinylsiloxy groups and dimethylsiloxy groups; and a third useful gum is composed of methylvinylsiloxy groups, dimethylsiloxy groups and diphenylsiloxy groups.

The invention is particularly applicable to the production of stabilized silicone elastomers from organopolysiloxane gums containing hydrocarbon groups that render the resulting elastomer susceptible to decomposition at elevated temperatures. By way of illustration, satisfactory silicone elastomers can be produced by the process of this invention from gums containing silicon-bonded ethyl groups and/or vinyl groups.

The curing of a starting organopolysiloxane gum involves the production of crosslinks between the molecules of the gum. Silicon-bonded monovalent olefinically unsaturated hydrocarbon groups [i.e. groups represented by R' in Formula 1] react to produce such crosslinks. The relative amount of the siloxane groups represented by Formula 1 wherein R' is a monovalent olefinically unsaturated hydrocarbon group contained in the gum is that amount which provides the degree of crosslinking necessary to impart elastomeric properties to the cured product. The cured products produced from gums that are crosslinked by an insufficient amount of groups represented by Formula 1 wherein R' is a monovalent olefinically unsaturated hydrocarbon group are soft and gummy rather than elastomeric. The cured products produced from gums that are crosslinked by an excessive amount of groups represented by Formula 1 wherein R' is a monovalent olefinically unsaturated hydrocarbon group are hard and brittle rather than elastomeric. Generally, amounts of such siloxane groups from 0.05 part to 3.0 parts by weight per 100 parts by weight of the siloxane groups in the gum usually provide the degree of crosslinking necessary to produce an elastomeric product. Preferably, the starting gum contains from 0.2 part to 0.4 part by weight of such siloxane groups per 100 parts by weight of the siloxane groups in the gum. Conversely, in this instance, the gum may contain from 97.0 parts to 99.95 parts by weight but preferably contains from 99.6 parts to 99.8 parts by weight of siloxane groups represented by Formua 1 wherein R' is a monovalent hydrocarbon group that is free of olefinic unsaturation.

Diacyl peroxide curing agents preferentially cause monovalent olefinically unsaturated groups to produce crosslinking. However, alkyl groups, such as methyl and ethyl groups, can be cured to produce crosslinking by diacyl peroxide curing agents. Hence, the presence of silicon-bonded monovalent olefinically unsaturated hydrocarbon groups in the starting organopolysiloxane gum is not essential.

Starting organopolysiloxane gums that are useful in this invention may be produced from chlorosilanes or alkoxysilanes by known hydrolysis, condensation and equilibration processes. Useful starting organopolysiloxane gums and processes for their production are described in U.S. patent application Serial Number 470,834, filed November 23, 1954. Due to the monoorganosilane impurities (e.g. methyltrichlorosilane) and triorganosilane impurities (e.g. trimethylcholorsilane) in the starting materials, such organopolysiloxane gums usually contain small amounts of monoorganosiloxy groups (e.g. monomethylsiloxy groups) and triorganosiloxy groups (e.g. trimethylsiloxy groups). Small amounts of the latter mentioned groups may present by design as end-blocking or chain terminating groups.

Useful starting organopolysiloxane gums may contain small amounts of organic end-blocking or chain terminating groups. By way of illustration, useful gums may contain small amounts of alkoxy end-blocking groups.

The antioxidants that are useful in this invention are hydroxyl-substituted aromatic compounds. Illustrative of useful antioxidants are such hydroxyl-substituted aromatic compounds as alkyl substituted monohydric phenols (for example 2,6-di(tert-butyl)4-methyl phenol and 6 (tert-butyl)meta-cresol; aryloxy substituted phenols (for example 2-(tert-butyl)-4-phenoxy phenols; trihydric phenols (for example pyrogallol); dihydric phenols (for example 4-(tert-butyl)catechol, 4-phenyl catechol, 2,5-di(tert-butyl)hydroquinone, 3-methyl catechol and cyclohexyl catechol); di(hydroxyphenyl) alkanes (for example di(2-hydroxy-3-(tert-butyl)5-methyl phenyl)methane and dihydric naphthols (for example 1,5-dihydroxynaphthylene). The preferred antioxidants are alkyl-substituted phenols such as 2,6-di(tert-butyl)4-methyl phenol.

Apparently, the stabilizing effect at elevated temperatures of the antioxidants used in this invention is due, at least in part, to the presence of an aryl group in the molecules of these antioxidants. Aliphatic compounds having hydroxyl groups were not found useful in stabilizing silicone elastomers at elevated temperatures. By way of illustration, triethanolamine was found to be ineffective in stabilizing silicone elastomers at elevated temperatures.

The amount of antioxidant used in this invention is not narrowly critical. The amount of the antioxidant used will vary depending on the sensitivity of the silicone elastomer to oxidation and on the temperature at which the silicone elastomer will be employed. In most cases, amounts of antioxidants of from 0.1 part by weight to 0.75 part by weight per 100 parts by weight of the organopolysiloxane gum are useful, but, amounts of the antioxidants of from 0.4 part by weight to 0.5 part by weight per 100 parts by weight of the organopolysiloxane gum are preferred. The use of greater amounts of the antioxidants may result in some reaction of the antioxidants with the peroxide curing agent; and the use of lesser amounts of the antioxidants may result in inadequate stabilization of the silicone elastomer especially when the elastomer is used at very high temperatures. However, other than the indicated amounts of antioxidant might be employed without any commensurate advantage being gained by so doing.

The curing agents that are useful in this invention are diacyl peroxides. These peroxides may be represented by the formula:

wherein R is a monovalent hydrocarbon group that is free of olefinic unsaturation as defined for Formula 1. Preferably, R is a phenyl group or a halogen-substituted phenyl group. Para-chlorobenzoyl peroxide and 2,4-dichlorobenzoyl peroxide are useful curing agents. Benzoyl peroxide is the preferred curing agent.

The amount of the diacyl peroxide used as a curing agent in this invention is not narrowly critical. When the starting gum cures by the reaction of silicon-bonded monovalent olefinically unsaturated hydrocarbon groups, the curing agent is usually employed in at least stoichiometric or chemically equivalent amounts, plus when necessary or desirable, a slight excess sufficient to compensate for any volatilization of the curing agent that may occur during curing. Thus, two moles of the curing agent might be used to cure a gum whose average composition corresponds to one mole of an organopolysiloxane containing two monovalent olefinically unsaturated hydrocarbon groups per molecule. In practice, the useful amount of the curing agent was found to vary from 0.1 part by weight to 4 parts by weight of the peroxide per 100 parts by weight of the organopolysiloxane gum whether the gum cures through the reaction of monovalent olefinically unsaturated hydrocarbon groups or through the reaction of other groups (e.g. methyl or ethyl groups). However, it is preferable to use from 0.5 part by weight to 1.0 part by weight of the peroxide per 100 parts by weight of the organopolysiloxane gum. The use of greater amounts of the curing agent may result in the reaction of the curing agent with the antioxidant; and the use of lesser amounts of the curing agent may result in an inadequate curing of the organopolysiloxane gum.

It was found that attempts to produce satisfactory silicone elastomers from mixtures containing an organopolysiloxane gum, a diacyl peroxide curing agent and a hydroxyl substituted aromatic compound as an antioxidant were unsuccessful when the antioxidant was present in the mixture in an amount equal to or greater than the amount of the curing agent. Apparently, the antioxidant and the curing agent react when the antioxidant is present in an amount equal to or greater than the amount of the curing agent. Hence, the curable gum compounds of this invention contain more curing agent than antioxidants on a weight basis. Amounts of antioxidants of from 0.2 part to 0.9 part by weight per part by weight of the curing agent are useful but amounts of antioxidant of from 0.5 part to 0.7 part by weight per part by weight of the curing agent are preferred. Other organic antioxidant-organic peroxide curing agent combinations (such as a combination of hydroxy substituted aromatic compound as an antioxidant and dialkyl peroxide curing agent or a combination of an aryl amine antioxidant and a diacyl peroxide curing agent) were found to react and so are not useful in curable gum compounds when used in any relative amounts.

In producing the stabilized silicone elastomers of this invention, a curable gum compound is formed containing an organopolysiloxane gum, a hydroxyl-substituted aromatic compound as an antioxidant and a diacyl peroxide curing agent. As used herein the phrase, "curable gum compound" denotes a mixture that can be cured to produce a silicone elastomer. These mixtures may be formed in known apparatus such as two-roll rubber mills and the like employing the above-indicated amounts of the gum, the antioxidant and the curing agent. Preferably, the antioxidant is first mixed with the organopolysiloxane gum and then the peroxide is added.

In the practice of this invention a uniform dispersion of the antioxidant throughout the organopolysiloxane gum and, consequently, the production of a silicone elastomer containing a uniformly dispersed antioxidant is readily achieved since the gum is in a plastic and easily workable state. The amounts of the antioxidant incorporated is readily controlled and the antioxidant may be added in its pure form, no solvent being required. These desirable features are not obtainable by known processes for incorporating organic antioxidants in silicone elastomers i.e. applying a solution containing an organic antioxidant and an organic solvent to a cured elastomer.

A filler is usually used in the curable gum compounds of the invention. The fillers that are useful in this invention include acidic fillers (such as uncoated finely divided silica), basic fillers (such as alumina) and neutral fillers (such as quartz, coated finely divided silica, calcium carbonate and diatomaceous earth). These fillers impart desirable physical properties (e.g. high tensile strength) to silicone elastomers.

The effectiveness of diacyl peroxides as curing agents is impaired when they are used in curable gum compounds containing carbonaceous fillers. Hence, carbonaceous fillers are not employed in this invention.

The amount of the filler used in this invention is not narrowly critical and may range from 25 parts to 65 parts by weight of the filler per 100 parts by weight of the gum. Preferably from 35 parts to 45 parts by weight of the filler per 100 parts by weight of the gum are employed.

It is often advantageous to preblend the filler and the organopolysiloxane gum and allow the mixture to bin age. This procedure promotes wetting of the filler by the gum. Then the antioxidant and the curing agent may be mixed with the preblended filler and gum to produce a curable gum compound.

The coated finely divided silicas that may be blended with the curable mixtures used in this invention include those coated silicas that contain alkoxy groups attached to the silicon atoms on the surface of the silica. It has been found that such coated silicas, although usually susceptible to decomposition at high temperatures, are stabilized by the antioxidants used in this invention.

A curable gum compound of this invention containing no filler may be applied to a fibrous material and cured thereon to produce an elastomer. In such cases the elastomer has physical properties comparable to an elastomer produced from a curable gum compound containing a filler. Apparently, the fibrous material functions as a filler.

In the practice of this invention a curable gum compound containing an organopolysiloxane gum, a hydroxyl-substituted aromatic compound as an antioxidant and a diacyl peroxide curing agent is cured by heating the gum compound. The gum compound may be heated by various known means, such as in a slab mold. The gum compound may be cured by heating to a temperature of from 110° C. to 200° C. The preferred curing temperature when the organopolysiloxane gum is cured by the reaction of monovalent olefinically unsaturated hydrocarbon groups is from 170° C. to 180° C. The preferred curing temperature when the gum is cured by the reaction of alkyl groups is from 120° C. to 130° C. The curable gum compound may be maintained at the curing temperature for from 5 minutes to 30 minutes but preferably for from 15 minutes to 20 minutes. Heating the gum compound to other temperatures for other periods of time may accomplish the cure of the mixture, since the particular temperature and time used is not narrowly critical, but no particular advantage is gained by departing from the indicated temperature and time ranges.

The stabilized silicone elastomers of this invention are useful in the various applications where known silicone elastomers are used and are particularly useful in high temperature applications where known silicone elastomers would decompose and lose their desirable properties. By way of illustration, the stabilized silicone elastomers of this invention are uniquely suited for service in high temperature environments such as may be encountered by oven seals, coatings, electrical conductors, steam heated rolls for paper mills, glass to metal sealants for arc lamps and hoses for jet engines. The stabilized silicone elastomers of this invention produced from gums containing 0.35 part by weight of ethylvinylsiloxy groups and 99.65 parts by weight of dimethylsiloxy groups per 100 parts by weight of the siloxane groups in the gum may be used at temperatures of from 250° C. to 350° C. without appreciable loss of their physical properties.

Known heat aging tests may be used to determine the stability of the stabilized silicone elastomers of this invention. By way of illustration, the latter mentioned silicone elastomer may be heat aged by maintaining the elastomer at a temperature of from 250° C. to 315° C. for 24 hours. The retention of satisfactory physical properties (such as tensile strength, elongation, set at break, hardness) by the heat aged elastomer indicates its stability. Stabilized silicone elastomers of this invention, when heat aged in this manner, were found to retain satisfactory physical properties.

The following examples illustrate this invention.

The results of experiments I to V are tabulated in Table I.

EXAMPLE I

A curable gum compound was formed on a conventional two roll, six inch rubber mill. The gum compound contained the following components: 100 parts by weight of a dimethylpolysiloxane gum, 40 parts by weight of finely divided silica ("Santocel CS"), 0.8 part by weight of benzoyl peroxide and 0.5 part by weight of 2,6-di(tert-butyl)4-methyl phenol. The dimethylpolysiloxane gum contained 0.35 part by weight of ethylvinylsiloxy groups and 99.65 parts by weight of dimethylsiloxy groups per 100 parts by weight of the siloxane groups in the gum. The gum and the finely divided silica had been pre-blended and aged. The gum compound so formed was cured in a conventional slab mold by heating for fifteen minutes at 125° C. to produce an elastomer. The elastomer was heat aged by heating for 24 hours at 250° C. (see Table I, references A and B).

EXAMPLE II

A mixture was formed on a conventional two roll, six inch rubber mill. The mixture contained the following components: 100 parts by weight of a dimethylpolysiloxane gum, 40 parts by weight of finely divided silica ("Santocel CS"), 0.8 part by weight of di(tert-butyl) peroxide and 0.5 part by weight of 2,6-di(tert-butyl)4-methyl phenol. The dimethylpolysiloxane gum contained 0.35 part by weight of ethylvinylsiloxy groups and 99.65 parts by weight of dimethylsiloxy groups per 100 parts by weight of the siloxane groups in the gum. The gum and the finely divided silica had been pre-blended and aged. The mixture so produced was cured in a conventional slab mold by heating for twenty minutes at 174° C. Very little cure was obtained, indicating that dialkyl peroxide curing agents and phenol antioxidants cannot be used together in producing silicone elastomers. (See Table I, reference C.)

EXAMPLE III

A curable gum compound was formed on a conventional two roll, six inch rubber mill. The gum compound contained the following components: 100 parts by weight of a diethylpolysiloxane gum, 50 parts by weight of finely divided silica ("Hi-Sil-X-303"), 2.5 parts by weight of benzoyl peroxide and 0.5 part by weight of 2,6-di(tert-butyl)4-methyl phenol. The gum and the finely divided silica had been pre-blended and aged. The gum compound so produced was cured by heating in a conventional slab mold for sixteen minutes at 125° C. to produce an elastomer. One part of the elastomer so produced was then heat aged by heating the elastomer for three hours at 150° C. Another part of the elastomer was heat aged by heating the elastomer for six hours at 150° C. (see Table I, references D, E and F).

EXAMPLE IV

Using the procedure used in Example III, another elastomer was formed from a curable gum compound that was similar to the gum compound used in Example III, but containing no antioxidant (i.e. 2,6-di(tert-butyl)4-methyl phenol). The brittleness acquired by this elastomer after heating indicates the need for the presence of an antioxidant to stabilize silicone elastomers at elevated temperatures (see Table I, references G, H and I).

EXAMPLE V

A gum compound was formed on a conventional two roll, six inch rubber mill. The gum compound contained the following components: 100 parts by weight of dimethylpolysiloxane gum, 40 parts by weight of finely divided silica ("Santocel CS"), 2.0 parts by weight of benzoyl peroxide and 0.5 part by weight phenyl-beta-naphthylamine. The gum compound turned brown while being mixed in the mill. The sheet produced in the mill was heated with a conventional slab mold for twenty minutes at 125° C. Very little cure was obtained indicating that diacyl peroxide curing agents and amine antioxidants cannot be used together in producing a satisfactory silicone elastomer (see Table I, reference J).

What is claimed is:

1. A process for producing stabilized silicone elastomers which comprises forming a curable gum compound containing an organopolysiloxane gum containing from 1.95 to 2.05 monovalent hydrocarbon groups per silicon atom, a hydroxyl-substituted aromatic compound as an antioxidant and a diacyl peroxide curing agent in an amount by weight greater than the amount of the antioxidant and heating the curable gum compound to a temperature sufficiently elevated to cure the gum compound to produce an elastomer.

2. A process for producing stabilized silicone elastomers which comprises forming a curable gum compound containing an organipolysiloxane gum that is composed of siloxane groups having the formula:

wherein R is a monovalent hydrocarbon group that is free of olefinic unsaturation and R' is a member selected from the group consisting of monovalent hydrocarbon

*Table I*

| | Reference | | | | | | | | | |
|---|---|---|---|---|---|---|---|---|---|---|
| | A | B | C | D | E | E | G | H | I | J |
| Antioxidant: | | | | | | | | | | |
| Type | b DTBMP | DTBMP | DTBMP | DTBMP | DTBMP | DTBMP | None | None | None | h PBNA |
| Amount a | 0.5 | 0.5 | 0.5 | 0.5 | 0.5 | 0.5 | | | | 0.5 |
| Peroxide | c BP | BP | e DTBP | BP | BP | BP | BP | BP | BP | BP |
| Heating: | | | | | | | | | | |
| Temp. (° C.) | d 125 | *250 | d 174 | d 125 | *150 | *150 | d 125 | *150 | *150 | d 125 |
| Time (hrs.) | ¼ | 24 | ⅓ | 4/15 | 3 | 6 | 4/15 | 3 | 6 | ⅓ |
| Physical Properties: | | | | | | | | | | |
| Tensile (p.s.i.) | 667 | 571 | (f) | 660 | 679 | 785 | 495 | 571 | (g) | (f) |
| Elongation (percent) | 730 | 375 | | 325 | 175 | 150 | 400 | 100 | | |
| Set at Break (percent) | 10 | 5 | | 10 | 0 | 0 | 5 | 0 | | |
| Hardness (Shore A) | 35 | 55 | | 58 | 74 | 78 | 57 | 80 | | | a The amount of antioxidant is in parts by weight of antioxidant per 100 parts by weight of the organopolysiloxane gum.
b DTBMP is 2,6-di(tert-butyl)4-methyl phenol.
c BP is benzoyl peroxide.
d Mold cure.
e DTBP is di(tert-butyl) peroxide.
f The physical properties could not be measured since little cure was obtained.
g The product was too brittle to test.
h PBNA is phenyl-beta-naphthylamine.
*Heat aging.

groups that are free of olefinic unsaturation and monovalent olefinically unsaturated hydrocarbon groups and that has a ratio of organic groups to silicon atoms of from 1.95 to 2.05, a hydroxyl-substituted aromatic compound as an antioxidant and a diacyl peroxide curing agent in an amount by weight greater than the amount of the antioxidant and heating the curable gum compound to a temperature sufficiently elevated to cure the gum compound to produce an elastomer.

3. The process of claim 2 wherein the antioxidant is an alkyl-substituted phenol.

4. The process of claim 2 wherein the antioxidant is 2,6-di(tert-butyl) 4-methyl phenol.

5. The process of claim 2 wherein R' is a monovalent hydrocarbon group that is free of olefinic unsaturation.

6. The process of claim 2 wherein the organopolysiloxane gum contains from 0.05 part to 3.0 parts by weight of siloxane groups represented by the formula

wherein R is a monovalent hydrocarbon group that is free of olefinic unsaturation and R' is a vinyl group per 100 parts by weight of the siloxane groups in the gum.

7. The process of claim 2 wherein the antioxidant is present in an amount from 0.2 part to 0.9 part per part by weight of the curing agent.

8. The process of claim 2 wherein the antioxidant is present in an amount from 0.5 part to 0.7 part per part by weight of the curing agent.

9. The process of claim 2 wherein the curing agent is benzoyl peroxide.

10. A curable gum compound comprising an organopolysiloxane gum containing from 1.95 to 2.05 monovalent hydrocarbon groups per silicon atom, a hydroxyl-substituted aromatic compound as an antioxidant and a diacyl peroxide curing agent in an amount by weight greater than the amount of the antioxidant.

11. A curable gum compound comprising an organopolysiloxane gum that is composed of siloxane groups having the formula:

wherein R is a monovalent hydrocarbon group that is free of olefinic unsaturation and R' is a member selected from the group consisting of monovalent hydrocarbon groups that are free of olefinic unsaturation and monovalent olefinically unsaturated hydrocarbon groups and that has a ratio of organic groups to silicon atoms of from 1.95 to 2.05, a hydroxyl-substituted aromatic compound as an antioxidant and a diacyl peroxide curing agent in an amount by weight greater than the amount of the antioxidant.

12. The curable gum compound of claim 11 wherein the antioxidant is benzoyl peroxide.

13. The curable gum compound of claim 11 wherein the organopolysiloxane gum contains from 0.05 part to 3.0 parts by weight of siloxane groups represented by the formula

where R is a monovalent hydrocarbon group that is free of olefinic unsaturation and R' is a vinyl group per 100 parts by weight of the siloxane groups in the gum and wherein the antioxidant is present in an amount from 0.2 part to 0.9 part per part by weight of the curing agent.

14. A curable gum compound comprising (1) a dimethylpolysiloxane gum composed of 0.35 part by weight of ethylvinylsiloxy groups and 99.65 parts by weight of dimethylsiloxy groups; (2) a silica filler; (3) 2,6-di(tert-butyl)4-methylphenol as an antioxidant; and (4) benzoyl peroxide as a curing agent, said antioxidant being present in an amount from 0.5 part to 0.7 part per part by weight of said curing agent.

15. A stabilized silicone elastomer that contains a uniformly dispersed hydroxyl-substituted aromatic compound as an antioxidant and that is produced by curing a curable gum compound comprising an organopolysiloxane gum, containing from 1.95 to 2.05 monovalent hydrocarbon groups per silicon atom, a hydroxyl-substituted aromatic compound as an antioxidant and a diacyl peroxide curing agent in an amount by weight greater than the amount of the antioxidant.

16. A stabilized silicone elastomer containing a uniformly dispersed hydroxyl-substituted aromatic compound as an antioxidant produced from a curable gum compound comprising an organopolysiloxane gum that is composed of siloxane groups having the formula:

wherein R is a monovalent hydrocarbon group that is free of olefinic unsaturation and R' is a member selected from the group consisting of monovalent hydrocarbon groups that are free of olefinic unsaturation and monovalent olefinically unsaturated hydrocarbon groups and that has a ratio of organic groups to silicon atoms of from 1.95 to 2.05, a hydroxyl-substituted aromatic compound as an antioxidant and a diacyl peroxide curing agent in an amount by weight greater than the amount of the antioxidant.

17. The stabilized silicone elastomer of claim 16 wherein the antioxidant is benzoyl peroxide.

18. The stabilized silicone elastomer of claim 16 wherein the organopolysiloxane gum contains from 0.05 part to 3.0 parts by weight of siloxane groups represented by the formula

where R is a monovalent hydrocarbon group that is free of olefinic unsaturation and R' is a vinyl group per 100 parts by weight of the siloxane groups in the gum and wherein the antioxidant is present in an amount from 0.2 part to 0.9 part per part by weight of the curing agent.

References Cited in the file of this patent

UNITED STATES PATENTS

| | | |
|---|---|---|
| 2,557,928 | Atkinson | June 26, 1951 |
| 2,666,041 | Pfeifer | Jan. 12, 1954 |
| 2,697,114 | Chenicek | Dec. 14, 1954 |
| 2,837,494 | Gilbert et al. | June 3, 1958 |
| 2,838,472 | Luca | June 10, 1958 |